(12) United States Patent
Akashi

(10) Patent No.: US 8,488,156 B2
(45) Date of Patent: Jul. 16, 2013

(54) IMAGE PROCESSING APPARATUS AND COMMUNICATING METHOD FOR DYNAMICALLY ASSIGNING A TRANSMISSION DESTINATION BASED ON THE TYPE OF JOB

(75) Inventor: Masamichi Akashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/542,616

(22) Filed: Aug. 17, 2009

(65) Prior Publication Data

US 2009/0303540 A1 Dec. 10, 2009

Related U.S. Application Data

(63) Continuation of application No. 10/087,816, filed on Mar. 5, 2002, now abandoned.

(30) Foreign Application Priority Data

Mar. 6, 2001 (JP) .................................. 2001-062558
Feb. 18, 2002 (JP) .................................. 2002-040016

(51) Int. Cl.
*G06F 15/00* (2006.01)

(52) U.S. Cl.
USPC .......... 358/1.15; 709/225; 709/232; 709/245; 710/12

(58) Field of Classification Search
USPC ............. 358/1.15; 709/225, 232, 245; 710/12
See application file for complete search history.

(56) References Cited

U.S. PATENT DOCUMENTS

| | | | |
|---|---|---|---|
| 5,646,872 A | 7/1997 | Yonenaga et al. | |
| 6,195,366 B1 | 2/2001 | Kayashima et al. | |
| 6,219,706 B1 | 4/2001 | Fan et al. | |
| 6,276,771 B1 * | 8/2001 | Kim et al. | 347/3 |
| 6,353,860 B1 * | 3/2002 | Hare et al. | 719/316 |
| 6,530,025 B1 | 3/2003 | Nakagawa et al. | |
| 6,700,891 B1 | 3/2004 | Wong | |
| 7,113,298 B2 | 9/2006 | Mochizuki | |

FOREIGN PATENT DOCUMENTS

| | | |
|---|---|---|
| JP | 2000-035871 | 2/2000 |
| JP | 2000-347808 | 12/2000 |

OTHER PUBLICATIONS

IANA Well Known Port Numbers, Oct. 1994.

* cited by examiner

*Primary Examiner* — Peter K Huntsinger
(74) *Attorney, Agent, or Firm* — Fitzpatrick, Cella, Harper & Scinto

(57) ABSTRACT

An image processing apparatus according to the invention prevents communication with computers connected via a network from being uniformly restricted, and restricts the communication with the computers in accordance with a kind of received data or a kind of data process.

7 Claims, 9 Drawing Sheets

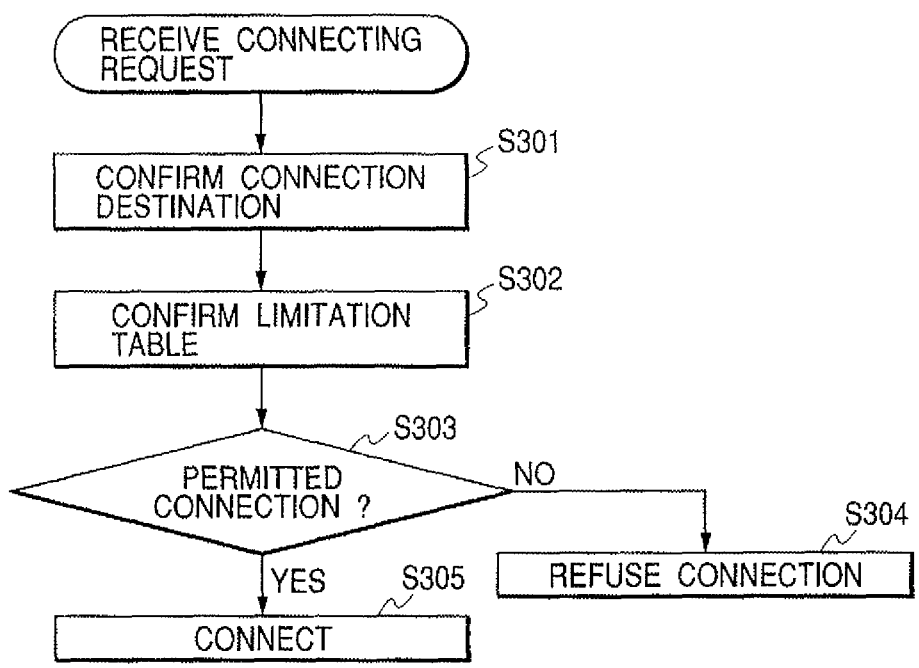
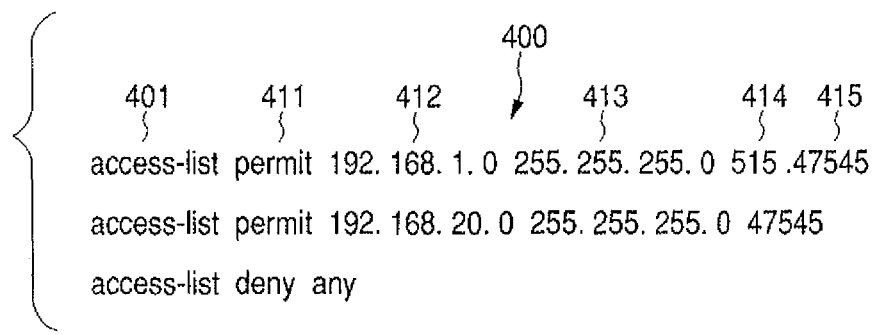

600

DEFAULT OPERATION DESIGNATION : CONNECTION PERMISSION (CONNECTION REFUSAL)

FIG. 8

801 — access-list deny 172.20.11.0 255.255.255.0 any
802 ⎨ access-list permit 172.22.10.0 255.255.255.0 515
     ⎩ access-list deny 172.22.10.0 255.255.255.0 47545
803 ⎨ access-list permit 150.61.66.101 255.255.255.255 515
     ⎩ access-list permit 150.61.66.101 255.255.255.255 47545
     access-list deny any

FIG. 9

901 — access-list permit 172.22.10.0 255.255.255.0 515
902 ⎨ access-list permit 150.61.66.101 255.255.255.255 515
     ⎩ access-list permit 150.61.66.101 255.255.255.255 47545
903 — access-list deny any

IMAGE PROCESSING APPARATUS AND COMMUNICATING METHOD FOR DYNAMICALLY ASSIGNING A TRANSMISSION DESTINATION BASED ON THE TYPE OF JOB

This application is a continuation of application Ser. No. 10/087,816, filed Mar. 5, 2002 (pending).

BACKGROUND OF THE INVENTION

1. Field of the Invention

The invention relates to an image processing apparatus and a communicating method in the image processing apparatus and, more particularly, to an image processing apparatus and a communicating method in the image processing apparatus, in which communication with a computer connected via a network can be limited.

2. Related Background Art

In a copying apparatus, the user uses the copying apparatus by using a card, the copying apparatus permits only the user who possesses the card to use the copying apparatus or manages the number of used print sheets every card and limits the use of the copying apparatus so that the number of used print sheets lies within the upper limit number of print sheets.

A telephone or a facsimile apparatus for transmitting and receiving data by using a telephone line can refuse a call reception from a registered telephone number or permit only the call reception from the registered telephone number.

A network printer for printing on the basis of print data transmitted from a general computer can be connected to the general computer via a network, and transmits and receives various data to/from the general computer.

SUMMARY OF THE INVENTION

Since the network printer, however, receives the print data via the network and prints on the basis of the print data, there is a problem such that communication with the general computer cannot be limited by using the card.

In case of receiving the print data via the network, the network printer receives the print data by using a plurality of kinds of network protocols or via a plurality of kinds of logical ports. There is a case where a different printing process is executed in accordance with the used network protocol or a different printing process is executed in accordance with the port through which the print data was received.

Further, the network printer receives management command data other than the print data via the network, thereby enabling the user to manage or operate the network printer from a remote location.

Therefore, if the network printer merely enables a computer in which it desires to refuse communication to be registered and does not communicate with the registered computer, all print data from the registered computers cannot be received irrespective of the used network protocol or irrespective of the port through which the data was received. The print data and management command data from the registered computers cannot be received at all.

The invention is made in consideration of the above problems and it is an object of the invention to prevent communication with a computer connected via a network from being uniformly limited and make it possible to limit the communication with the computer in accordance with a kind of data which is received or a kind of data process.

BRIEF DESCRIPTION OF THE DRAWINGS

FIG. 3 is a flowchart showing a print managing method;

FIG. 4 is a diagram showing a connection limitation table;

FIG. 8 is a diagram showing a connection limitation table;

FIG. 9 is a diagram showing a connection limitation table;

DETAILED DESCRIPTION OF THE PREFERRED EMBODIMENT

An embodiment of the invention will be described in detail hereinbelow with reference to the drawings. In the embodiment, a print management apparatus will be explained as an example of an image processing apparatus.

Figure 1:
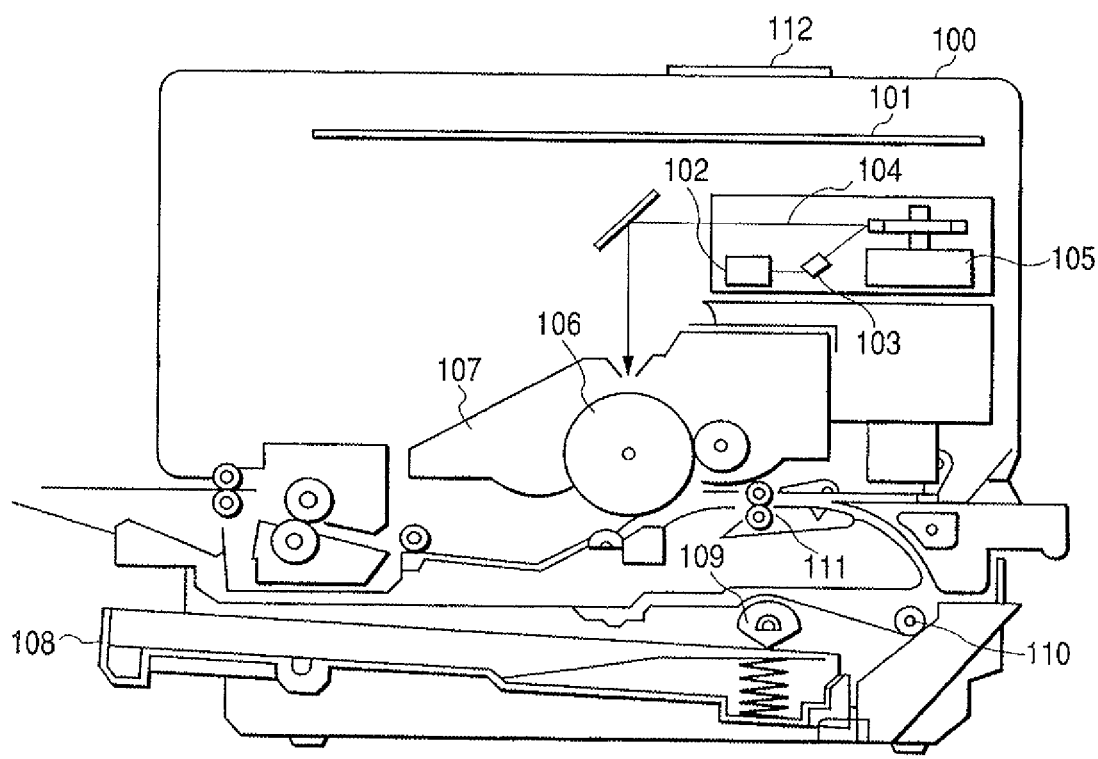
FIG. 1 is a cross sectional view showing an internal structure of a laser beam printer.

FIG. 1 is a cross sectional view showing an internal structure of a laser beam printer as an example of the print management apparatus according to the embodiment of the invention. A laser beam printer (hereinafter, abbreviated to an LBP) 100 inputs character information, character codes, form information, macro commands, and the like which are supplied from a computer connected to the outside and stores them. In accordance with those information, the LBP 100 forms a corresponding character pattern, form pattern, or the like and forms an image onto recording paper as a recording medium. The LBP 100 can also register character patterns, form patterns, and the like from the outside.

The LBP 100 comprises: a control unit 101 for controlling the whole LBP and converting the character information or the like which is supplied from the computer into an image signal; a laser driver 102 for driving a semiconductor laser 103 in accordance with the image signal; an electrostatic drum 106 for forming an electrostatic latent image of the character pattern by a laser beam 104 emitted from the semiconductor laser 103; and a developing unit 107 for developing the electrostatic latent image. The print management apparatus according to the invention is applied to the control unit 101. The LBP 100 also comprises: a paper feed roller 109 and conveying rollers 110 and 111 for supplying the recording paper enclosed in a sheet cassette 108 to the electrostatic drum 106; and an operation panel 112 having switches for operation and a display such as an LED or the like.

With such a construction, the control unit 101 mainly converts the character information or the like supplied from the computer into an image signal of the corresponding character pattern and outputs it to the laser driver 102. The laser driver 102 switches the on/off operations of the laser beam 104 emitted from the semiconductor laser 103 in accordance with the inputted image signal. The laser beam 104 is deflected to the right and left by a rotary polygon mirror 105 and scans on the electrostatic drum 106. The latent image is developed by the developing unit 107 arranged around the electrostatic drum 106 and subsequently transferred onto the recording paper. A cut sheet is used as recording paper. The recording paper is enclosed in the sheet cassette 108, fetched into the apparatus main body by the paper feed roller 109 and conveying rollers 110 and 111, and supplied to the electrostatic drum 106.

Figure 2:
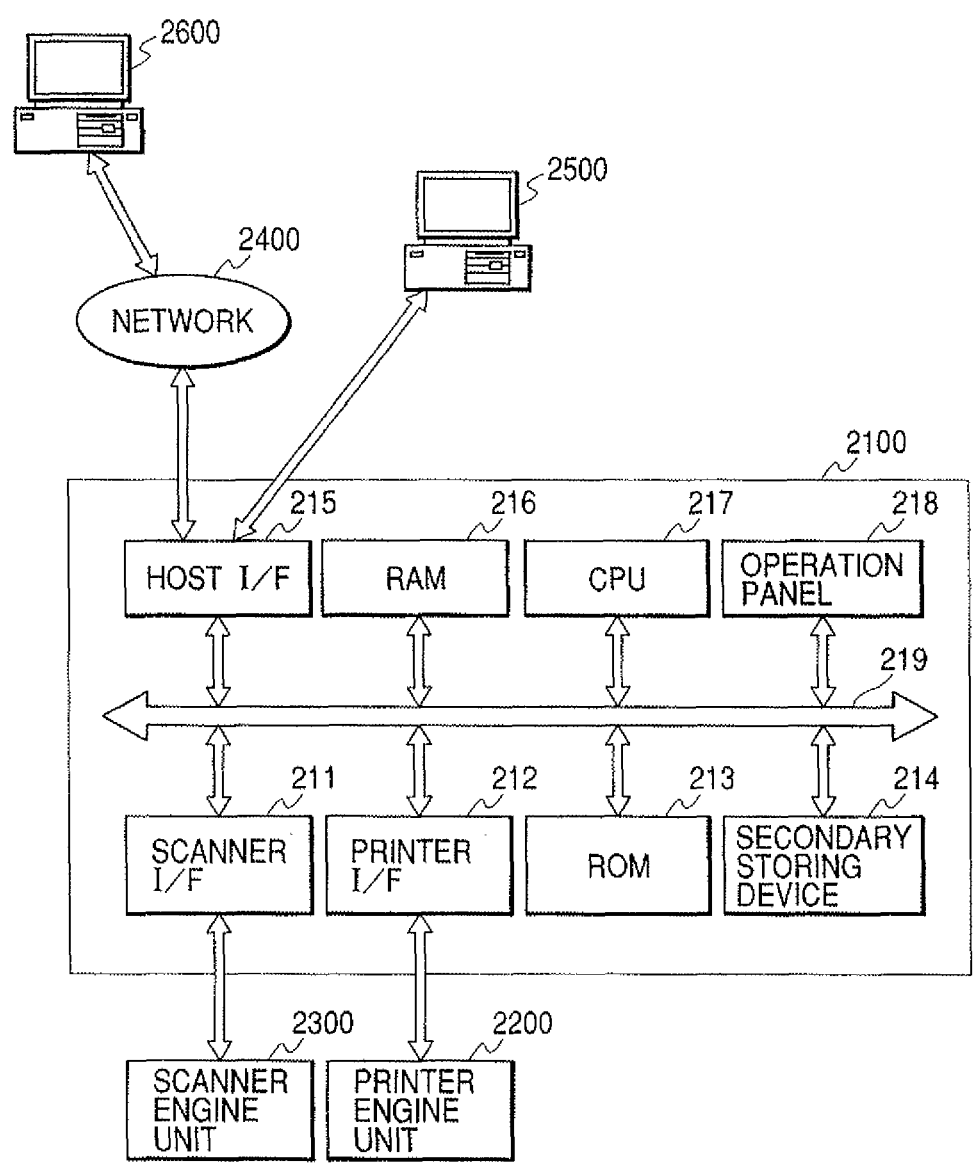
FIG. 2 is a block diagram showing a construction of a print management apparatus.

FIG. 2 is a block diagram showing a construction of a print management apparatus according to the embodiment of the invention. A print management apparatus 2100 comprises: a CPU 217 for controlling the whole apparatus; an ROM 213 in which a program for activating the apparatus, a program for controlling the apparatus, font information, various printer control languages, and the like have been stored; and an RAM 216 which provides a work area for information processes, a temporary memory area of data from a host interface 215, a buffer area for a secondary storing device 214, and the like. Those component elements 217, 213, and 216 are connected by an internal bus 219. The control unit in FIG. 1 corresponds to the print management apparatus 2100.

The secondary storing device 214 for storing the font information and the like, a scanner interface 211 for transmitting and receiving data to/from a scanner engine unit 2300, a printer interface 212 for transmitting and receiving the data to/from a printer engine unit 2200, the host interface 215 for transmitting and receiving the data to/from a network 2400 and a host computer 2500, and an operation panel 218 are connected by the internal bus 219, respectively.

The CPU 217 controls each unit in accordance with the program stored in the ROM 213 and the like and executes processes, which will be explained hereinlater.

The print management apparatus 2100 receives the print data from a host computer 2600 or the host computer 2500 via the network 2400. The print management apparatus 2100 analyzes the print data, forms image data of one page, outputs a video signal based on the image data to the printer engine unit 2200, and controls the printer engine unit 2200. The printer engine unit 2200 prints an image expressed by the image data onto the paper on the basis of the video signal outputted from the print management apparatus 2100.

The print management apparatus receives management command data from the host computer 2600 or 2500. In accordance with a command shown by the management command data, the print management apparatus executes the operation such as stop of the process of the print data, interruption of the process of the print data, restart of the process of the print data, deletion of the print data, notification of a status of the print management apparatus 2100, printer engine unit 2200, or scanner engine unit 2300, turn-off of a power source, resetting (initialization), or the like.

FIG. 3 is a flowchart showing a print managing method according to the embodiment of the invention. When data showing a connecting request (this data is abbreviated to a connecting request hereinbelow) is received from, for example, the host computer 2600 connected to the network 2400, the print management apparatus 2100 starts processes shown in FIG. 3. First, an address of the host computer 2600 and a port number of a connecting request destination are confirmed (step S301).

The address is a network address such as an IP address or the like in TCP/IP. The port-number is a number for identifying from which user the data has been sent or from which program the data has been derived in the case where a plurality of users use the apparatus or in the case where a plurality of programs are being executed by the apparatus. The port number is also a number for identifying for which user the data is provided or for which program the data is provided. As a representative number, there is a port number of the TCP/IP.

Figure 10:
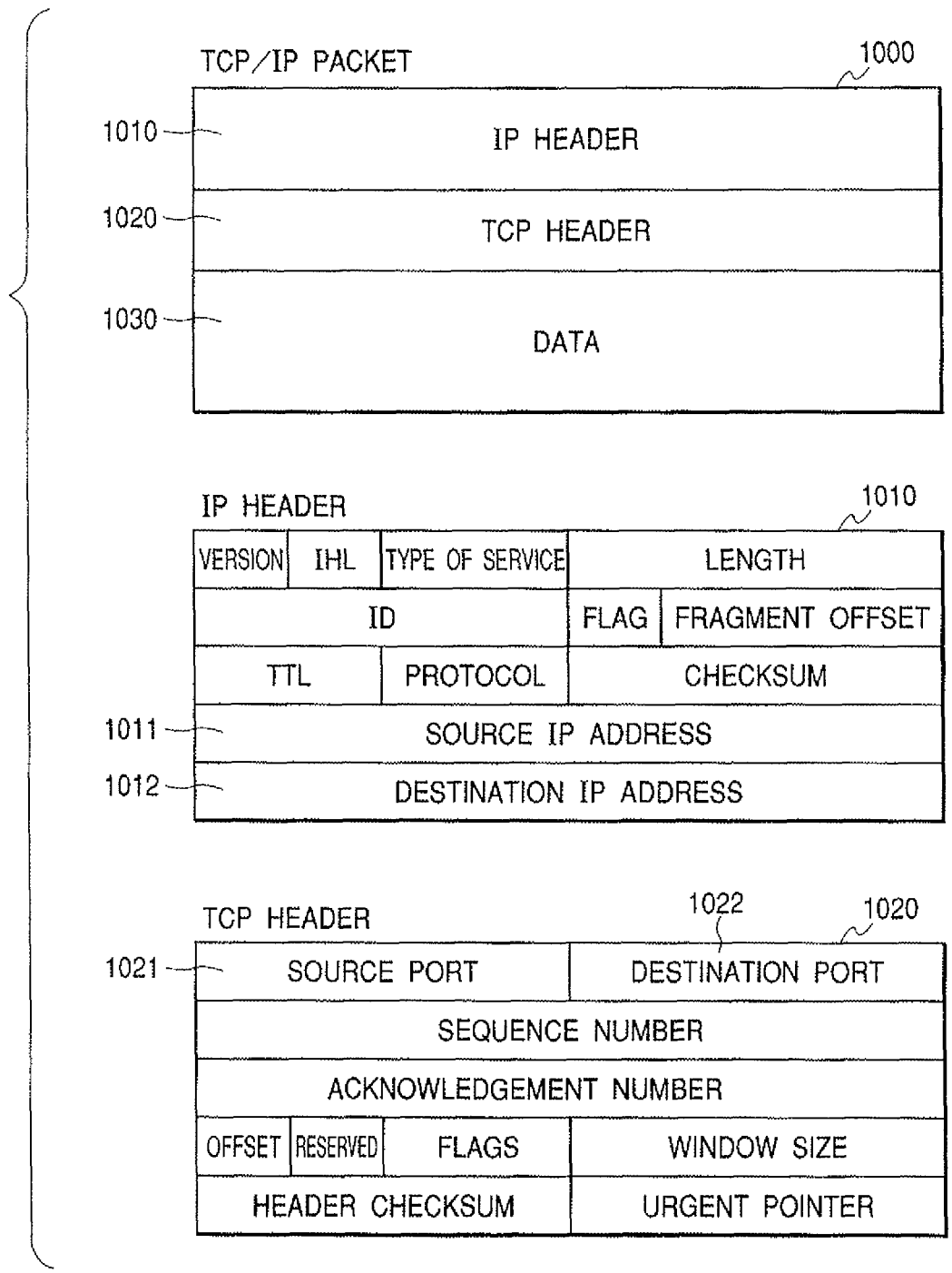
FIG. 10 is a diagram showing a data construction.

FIG. 10 is a diagram showing a data construction at the time when the connecting request or the print data is transferred in accordance with the TCP/IP. First, the connecting request or the print data is transferred in a form such that a TCP header 1020 and an IP header 1010 have been added to a data portion 1030. In case of the print data, the print data is stored into the data portion 1030. In case of the connecting request, a command to request for connection is stored into the data portion 1030. In case of other management command data, each command is stored into the data portion 1030.

In the IP header 1010, an IP address of a transferring source of the data is stored into 1011 and an IP address of a transfer destination of the data is stored into 1012. In the TCP header, a port number of the transferring source of the data is stored into 1021 and a port number of the transfer destination of the data is stored into 1022. Therefore, by checking the IP header and the TCP header, the print management apparatus 2100 can confirm the IP address of the host computer which has transmitted the connecting request or the print data and confirm the port number of the transfer destination.

Subsequently, a connection limitation table (FIG. 4), which will be explained hereinlater, is confirmed (step S302) and whether the connection is permitted or not is decided (step S303).

In case of permitting the connection, the print management apparatus 2100 establishes the connection to the host computer 2600 (step S305). After the connection was established, the print management apparatus 2100 communicates with the host computer, receives data necessary for the data process, and executes the data process in accordance with the received data. In case of the print data, a printing process is executed. In case of management command data, the apparatus is managed in accordance with a command shown by the management command data.

If the connection is not permitted, the connecting request is refused and the connection to the host computer 2600 is not established (step S304).

FIG. 4 is a diagram showing the connection limitation table according to the embodiment of the invention. In a connection limitation table 400, a plurality of connection limitation information has been stored in each line. Reference numeral 401 denotes a head of one connection limitation information and 411 indicates permission/refusal information showing whether the connection limitation information of a relevant line permits the connection or refuses it. If it permits the connection, "permit" is disclosed. If it refuses the connection, "deny" is disclosed. Reference numeral 412 denotes a network (IP) address of a computer which permits the connection; 413 an address mask; and 414 and 415 port numbers. A port number "515" is a print port number for transmitting and receiving the print data, "47545" indicates a management port number for transmitting and receiving the management command data for management, and "any" denotes a value showing all IP addresses and all port numbers.

Figure 5:
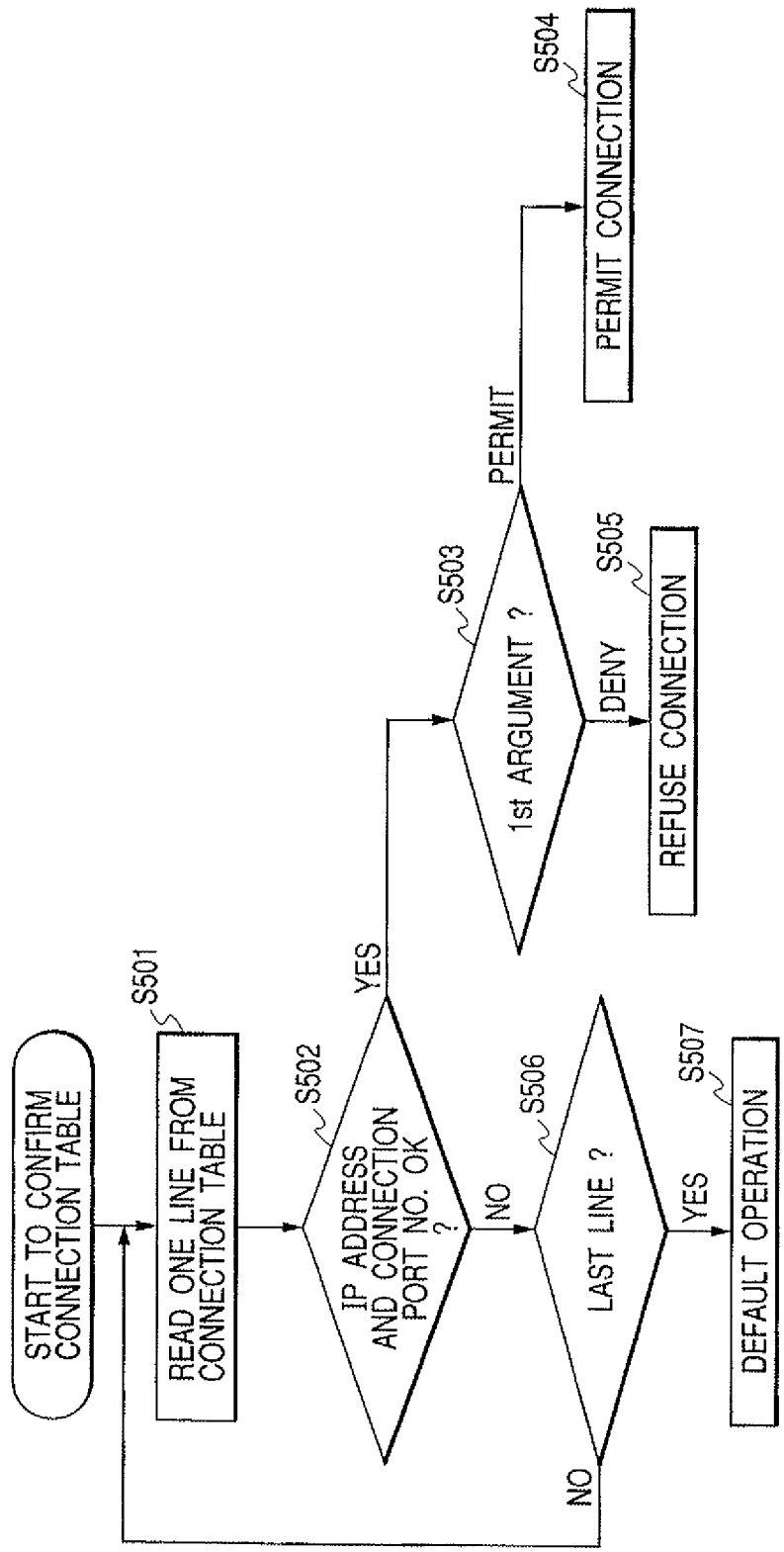
FIG. 5 is a flowchart showing a connection limiting method in the print managing method.

FIG. 5 is a flowchart showing a connection limiting method in the print managing method according to the embodiment of the invention. In FIG. 5, steps S303 and S304 of the print managing method shown in FIG. 3 are shown in detail. When the connecting request is confirmed, the print management apparatus 2100 starts processes in FIG. 5. First, the connection limitation information of one line is read out of the connection limitation table 400 (step S501). Subsequently, the read connection limitation information is compared with the IP address of the host computer which issued the connecting request and the port number of the connecting request destination (step S502). For example, in case of comparing with the connection limitation information of the first line, whether the IP address of the host computer which transmitted the connecting request is equal to "192.168.1.0" or not is discriminated, and further, whether the port number of the transfer destination of the connecting request is equal to "515" or "47545" is discriminated.

If it is determined in step S502 that they coincide, contents of the permission/refusal information are confirmed (step S503). In case of "permit", the connection to the host computer which transmitted the connecting request is established (step S504). In case of "deny", the connecting request is refused and the connection to the host computer is not established (step S505).

If it is determined in step S502 that they do not coincide, whether the line is the last line or not is discriminated (step S506). If it is not the last line, the next connection limitation information of one line is read (step S501). In case of the last line, the default operation is executed (step S507).

Figures 6, 7:
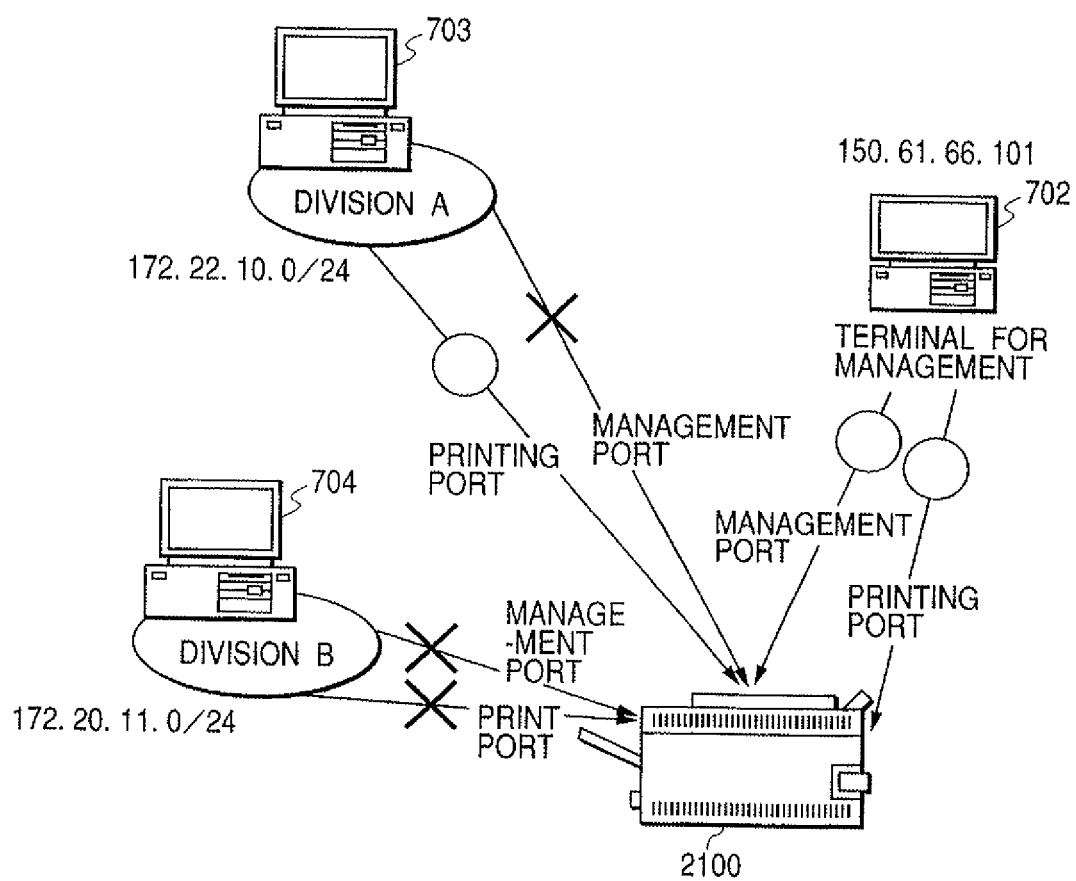
FIG. 6 is a diagram showing a default operation set table in the print managing method.
FIG. 7 is a diagram showing a construction of a print system.

FIG. 6 is a diagram showing a default operation set table in the print managing method according to the embodiment of the invention. A default operation set table 600 is a table in which the default operation for discriminating whether the connection is made when the connecting request is received from the host computer which does not correspond to the connection limitation table or not has been specified. In FIG. 6, "connection permission" has been set as a default operation.

Figure 11:
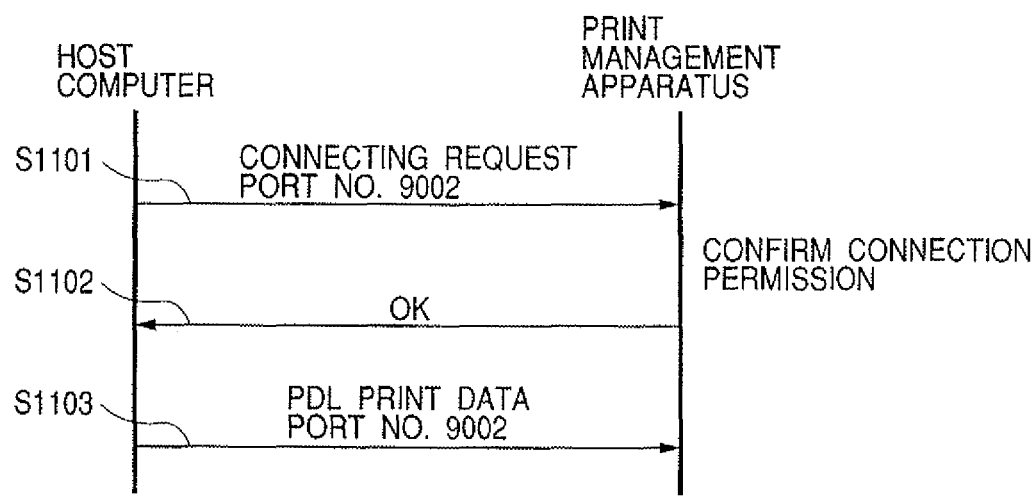
FIG. 11 is a flowchart showing the operations of a host computer and the print management apparatus.

An example in which the data processing method differs every port number will now be described. FIG. 11 is a flowchart showing the operations of the host computer and the print management apparatus 2100 in the case where the host computer inputs a PDL (Page Description Language) print job to the print management apparatus 2100. The print management apparatus 2100 operates as shown in FIG. 11 in accordance with the flowcharts of FIGS. 3 and 5.

First, the host computer transmits the connecting request to the print management apparatus 2100 in accordance with a print instruction from the user (step S1101). At this time, "9002" is set to the port number of the transfer destination of the connecting request. Thus, the print management apparatus 2100 confirms the IP address of the transferring source of the connecting request and the port number of the transfer destination, collates them with limitation table, and discriminates whether the connection is permitted or refused. In case of permitting the connection, data indicative of the permission of the connection is transmitted to the host computer (step S1102). In case of refusing, data indicative of the refusal of the connection is transmitted to the host computer.

When the data indicative of the permission of the connection is received from the print management apparatus 2100, the host computer transmits the print data described by the PDL (step S1103). In this instance, "9002" is set to the port number of the transfer destination of the print data. When the data indicative of the refusal of the connection is received from the print management apparatus 2100, the host computer does not transmit the print data but notifies the user of the fact that the print data cannot be transmitted. In response to this notice, the print management apparatus 2100 processes the received data as print data described by the PDL.

Figure 12:
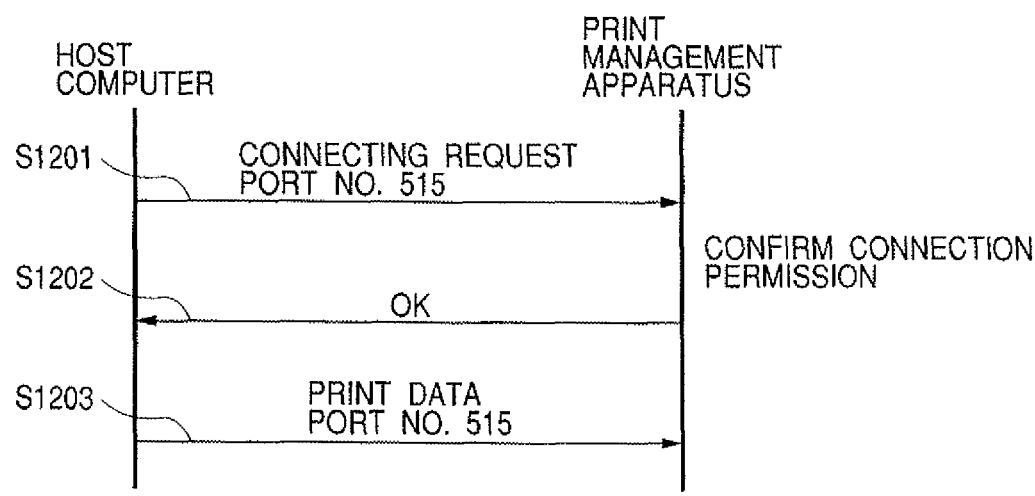
FIG. 12 is a flowchart showing the operations of the host computer and the print management apparatus.

FIG. 12 is a flowchart showing the operations of the host computer and the print management apparatus 2100 in the case where the host computer inputs a print job using a protocol such as LPD or LPR or a print application to the print management apparatus 2100. The print management apparatus 2100 operates as shown in FIG. 12 in accordance with the flowcharts of FIGS. 3 and 5.

First, the host computer transmits the connecting request to the print management apparatus 2100 in accordance with a print instruction from the user (step S1201). At this time, "515" is set to the port number of the transfer destination of the connecting request. Thus, the print management apparatus 2100 confirms the IP address of the transferring source of the connecting request and the port number of the transfer destination, collates them with limitation table, and discriminates whether the connection is permitted or refused. In case of permitting the connection, data indicative of the permission of the connection is transmitted to the host computer (step S1202). In case of refusing, data indicative of the refusal of the connection is transmitted to the host computer.

When the data indicative of the permission of the connection is received from the print management apparatus 2100, the host computer transmits the print data by using the protocol such as LPR or the print application (step S1203). In this instance, "515" is set to the port number of the transfer destination of the print data. When the data indicative of the refusal of the connection is received from the print management apparatus 2100, the host computer does not transmit the print data but notifies the user of the fact that the print data cannot be transmitted. In response to this notice, the print management apparatus 2100 receives the print data by using the protocol such as LPR or the print application and starts the printing process.

As other kinds of jobs, there are a copy job, a scan job, a BOX print job, a remote copy job, a remote scan job, a remote print job, an account job, a calibration job, a box operation job, a facsimile transmission job, a PDL resource job, and the like. If an individual port number has been allocated to each of those jobs, whether a process of each job is permitted or refused can be finely set.

As mentioned above, even if there are a plurality of kinds of data processing methods, by permitting or refusing the communication with the host computer every data process, a situation that all data from a certain host computer cannot be uniformly processed can be avoided.

An example in the case where the port number has been allocated to each of the process of the print data and the process of the management command data will now be described.

FIG. 7 is a diagram showing a construction of a print system to which the print management apparatus according to the embodiment of the invention is applied. According to the print system, a management computer (address "150.61.66.101") 702 for managing the print system, a computer (address "172.22.10.0") 703 of a division A in which only the printing is permitted, and a computer (address "172.22.11.0") 704 of a division B in which the printing and management are not permitted are connected to the print management apparatus 2100 having management ports and print ports.

To set the limitation as shown in FIG. 7, a connection limitation table as shown in FIG. 8 is prepared in the print management apparatus 2100. FIG. 8 is a diagram showing the connection limitation table corresponding to FIG. 7. Connection limitation information 801 to 803 has been stored in the connection limitation table. It is now assumed that a print port number is set to "515" and a management port number is set to "47545". The connection limitation information 801 corresponds to the computer (address "172.22.11.0") 704, and the connection in all ports including the print ports and management ports is refused, so that the printing and management are not permitted. The connection limitation information 802 corresponds to the computer (address "172.22.10.0") 703, and it will be understood that the printing at the first line is permitted but the management at the second line is not permitted. The connection limitation information 803 corresponds to the computer (address "150.61.66.101") 702, the printing at the first line is permitted, and the management at the second line is permitted.

By using the above construction, the port for transmitting the print data and the port for transmitting the management command data are provided, and whether the connection is permitted or refused can be set every port with respect to a certain computer, so that whether the printing is permitted or not and whether the management is permitted or not can be independently set, respectively.

To set the limitation as shown in FIG. 7, a connection limitation table as shown in FIG. 9 can be also prepared in the print management apparatus 2100. FIG. 9 is a diagram showing the connection limitation table corresponding to FIG. 7 and the same contents as those in FIG. 8 are described. Connection limitation information 901 corresponds to the computer (address "172.22.10.0") 703 and the printing is permitted. Connection limitation information 902 corresponds to the computer (address "150.61.66.101") 702, the printing at the first line is permitted, and the management at the second line is permitted. Further, by connection limitation information 903, the printing and the management of the computer 704 are not permitted and the management of the computer 703 is not permitted.

Although the management port and the print port have been described in the embodiment, the invention can be also applied to various ports such as copy port to transfer data for requesting the copy, scan port to transfer data for requesting the scan, resource port to transfer resources such as font, form data, and the like, event port to notify an event, for example, an error which occurred in the print management apparatus 2100 and printer engine unit 2200, and the like. The invention can be applied to not only a port peculiar to the printer but also a general lpd (Line Printer Daemon) port, an smtp (Simple Mail Transfer Protocol) port, and the like.

In the embodiment, it is presumed that the host computer knows the corresponding port number every kind of data process. However, a countermeasure method in the case where the host computer does not know the corresponding port number every kind of data process will now be described.

Figure 13:
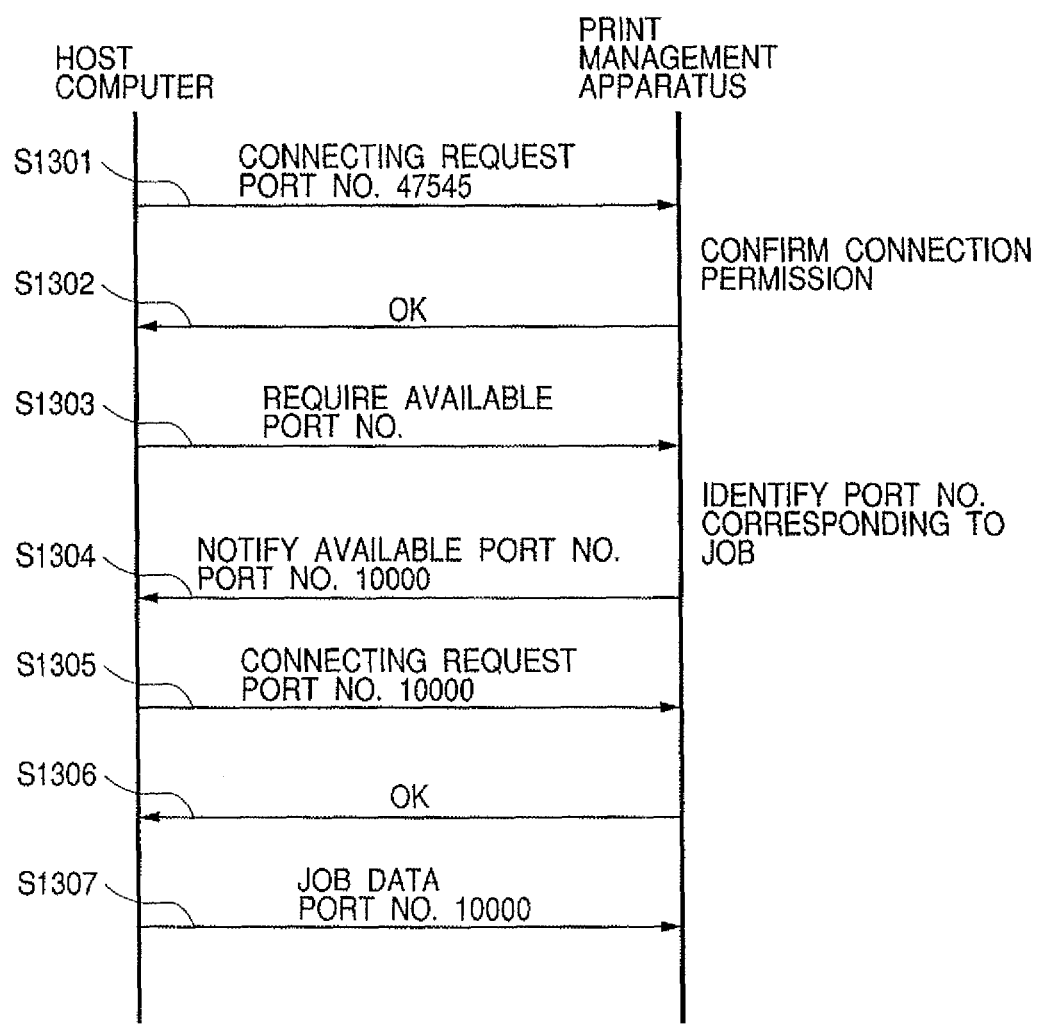
FIG. 13 is a flowchart showing the operations of the host computer and the print management apparatus.

FIG. 13 is a flowchart showing the operations of the host computer and the print management apparatus 2100 in the case where the host computer inputs the job to the print management apparatus 2100.

First, the host computer transmits the connecting request to the print management apparatus 2100 in accordance with an instruction from the user (step S1301). At this time, "47545" is set to the port number of the transfer destination of the connecting request. Thus, the print management apparatus 2100 confirms the IP address of the transferring source of the connecting request and the port number of the transfer destination, collates them with the connection limitation table, and discriminates whether the connection is permitted or refused. In case of permitting, data indicative of the permission of the connection is transmitted to the host computer (step S1302). In case of refusing, data indicative of the refusal of the connection is transmitted to the host computer.

When the data indicative of the permission of the connection is received from the print management apparatus 2100, the host computer requests the port number which can be used for transferring job data from the print management apparatus 2100 (step S1303). In response to this request, "47545" is set to the port number of the transfer destination. At the same time, the fact that it is desired to transmit the kind of data process, for example, the kind of job to be executed and the management data command is notified. Thus, the print management apparatus 2100 specifies the port number corresponding to the kind of data process and notifies the host computer of the specified port number (step S1304). "10000" is notified as a corresponding port number here.

Subsequently, the host computer again transmits the connecting request to the print management apparatus 2100 (step S1305). In this instance, "10000" is set to the port number of the transfer destination of the connecting request. Thus, the print management apparatus 2100 confirms the IP address of the transferring source of the connecting request and the port number of the transfer destination, collates with the connection limitation table, and discriminates whether the connection is permitted or refused. In case of permitting the connection, data indicative of the permission of the connection is transmitted to the host computer (step S1306).

When the data indicative of the permission of the connection is received from the print management apparatus 2100 again, the host computer transmits the job data (step S1307). At this time, "10000" is set to the port number of the transfer destination of the job data.

By using the above construction, the host computer does not need to know the corresponding port numbers with respect to the kinds of all data processes. Since it is possible to release only the management port numbers and not to release the port number corresponding to each job, the number of times in which the connection is erroneously established to the host computer to which the refusal of the connection could not be set can be reduced.

In step S1303 in FIG. 13, the fixed port number corresponding to the kind of data process has been notified. However, the print management apparatus 2100 can also dynamically allocate the port number and notify the host computer of the port number. In this case, the print management apparatus forms connection limitation information on the basis of the IP address of the host computer and the allocated port number and adds this connection limitation information to the connection limitation table. For example, assuming that the IP address of the host computer is equal to "134.233.21.1" and the allocated port number is equal to "20000", connection limitation information of "access-list permit 134.233.21.1 255.255.255.0 20000" is formed and added to the connection limitation table. After that, when the host computer sets "20000" to the port number of the transfer destination and transfers the job data, the connection is permitted.

By dynamically allocating the port number, the number of times in which even if the host computer sets the wrong port number and transfers the data, this data is erroneously received and processed can be reduced.

Although the embodiment has been described with respect to the ports regarding the IP protocol, logical ports can be also allocated to other protocols. Further, not only the ports regarding the protocol on the network but also an interface such as Centronics, serial interface, or the like can be also regarded as logical ports and allocated.

Although the embodiment has been described with respect to the MFP (Multi Function Peripheral) devices, the invention can be also applied to other print systems such as an ink jet system and the like. The invention can be also similarly applied to the copying apparatus. Moreover, the connection limitation table can be also set from a panel computer.

The print management apparatus can be also replaced with a printer itself such as copying apparatus, hybrid apparatus, or the like.

According to the invention as described above, a situation that the communication with the computers connected via the network is uniformly restricted is avoided and the communication with the computers connected can be restricted in accordance with the kind of received data or the kind of data process.

Also in the case where there are a plurality of kinds of data processing methods, by permitting or refusing the communication with the host computers every data process, a situation that all data from a certain host computer cannot be uniformly processed can be avoided.

Since the port for transmitting the print data and the port for transmitting the management command data are provided and whether the connection is permitted or refused can be set every port with respect to a certain computer, whether the printing is permitted or not and whether the management is permitted or not can be independently set, respectively.

What is claimed is:

1. A device comprising:
   a scanner configured to execute a scan process;
   a printer configured to execute a print process;
   a reception unit configured to receive a request of a job transmitted from a computer based on predetermined transmission destination information;
   a determination unit configured to determine whether the request received by the reception unit is a request of a print job for causing the device to execute the print process or a request of a scan job for causing the device to execute the scan process;
   an assigning unit configured to dynamically assign first transmission destination information used for transmitting print job data to the device for the execution of the print process in a case where it is determined by the determination unit that the received request is the request of the print job, and dynamically assign second transmission destination information used for transmitting scan job data to the device for the execution of the scan process in a case where it is determined by the determination unit that the received request is the request of the scan job; and
   a notification unit configured to notify the computer of the first or second transmission destination information dynamically assigned by the assigning unit, as a response to the request received by the reception unit,
   wherein the printer executes the print process in accordance with the print job data transmitted to the device based on the first transmission destination information from the computer, and
   wherein the scanner executes the scan process in accordance with the scan job data transmitted to the device based on the second transmission destination information from the computer.

2. The device according to claim 1, wherein the first transmission destination information and the second transmission destination information include a port number in a TCP/IP (Transmission Control Protocol/Internet Protocol).

3. The device according to claim 1, further comprising a control unit configured to control whether or not to execute the print process or the scan process for each computer requesting the execution of the print process or the scan process.

4. The device according to claim 3, further comprising a holding unit configured to hold the first or second transmission destination information assigned by the assigning unit and an address of the computer while associating the first or second transmission destination information and the address of the computer with each other,
   wherein the control unit controls whether or not to execute the print process or the scan process based on the information held by the holding unit.

5. The device according to claim 1, wherein the device can further execute a facsimile transmission process.

6. A controlling method of a device, comprising the steps of:
   causing a scanner to execute a scan process;
   causing a printer to execute a print process;
   receiving a request of a job transmitted from a computer based on predetermined transmission destination information;
   determining whether the received request is a request of a print job for causing the device to execute the print process or a request of a scan job for causing the device to execute the scan process;
   dynamically assigning first transmission destination information used for transmitting print job data to the device for the execution of the print process in a case where it is determined that the received request is the request of the print job, and dynamically assigning the second transmission destination information used for transmitting scan job data to the device for the execution of the scan process in a case where it is determined that the received request is the request of the scan job; and
   notifying the computer of the first or second transmission destination information dynamically assigned, as a response to the received request,
   wherein the printer executes the print process in accordance with the print job data transmitted to the device based on the first transmission destination information from the computer, and
   wherein the scanner executes the scan process in accordance with the scan job data transmitted to the device based on the second transmission destination information from the computer.

7. A non-transitory computer-readable medium for causing a computer to execute a controlling method of a device, comprising the steps of:
   causing a scanner to execute a scan process;
   causing a printer to execute a print process;
   receiving a request of a job transmitted from a computer based on predetermined transmission destination information;
   determining whether the received request is a request of a print job for causing the device to execute the print process or a request of a scan job for causing the device to execute the scan process;
   dynamically assigning first transmission destination information used for transmitting print job data to the device for the execution of the print process in a case where it is determined that the received request is the request of the print job, and dynamically assigning second transmission destination information used for transmitting scan job data to the device for the execution of the scan process in a case where it is determined that the received request is the request of the scan job; and
   notifying the computer of the first or second transmission destination information dynamically assigned, as a response to the received request,
   wherein the printer executes the print process in accordance with the print job data transmitted to the device based on the first transmission destination information from the computer, and
   wherein the scanner executes the scan process in accordance with the scan job data transmitted to the device based on the second transmission destination information from the computer.

* * * * *